April 10, 1951 — H. T. SEELEY — 2,548,625
DIFFERENTIAL PROTECTIVE ARRANGEMENT
Filed July 30, 1948
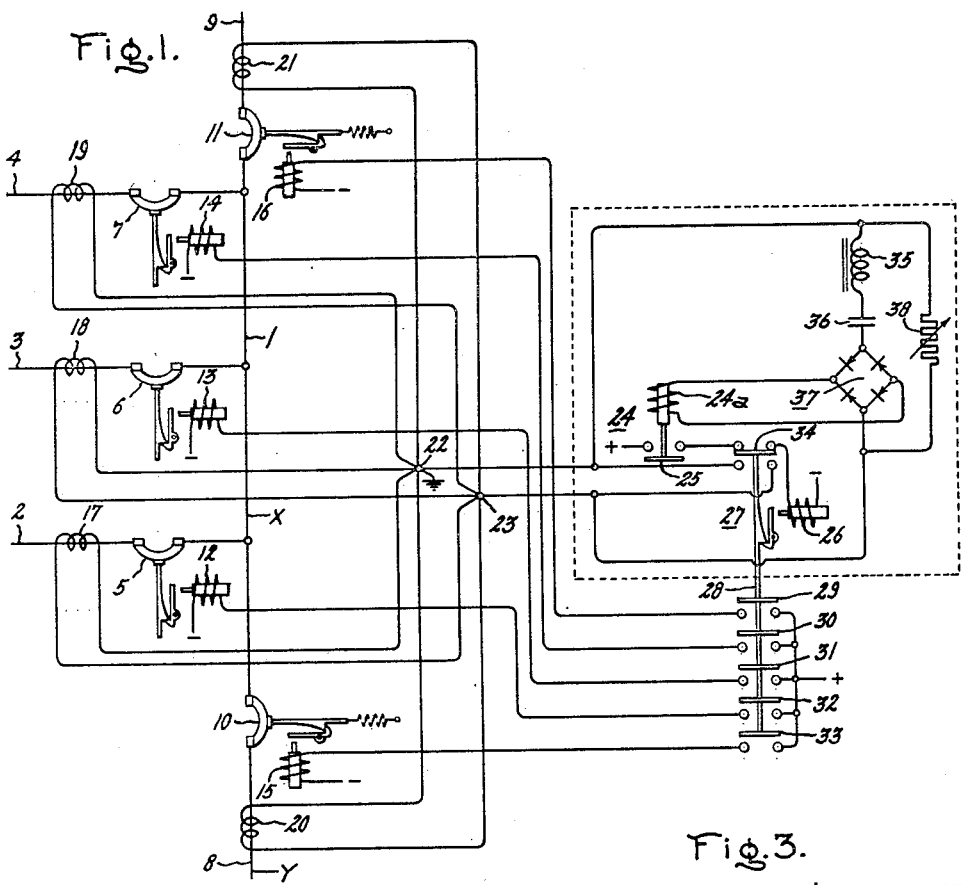
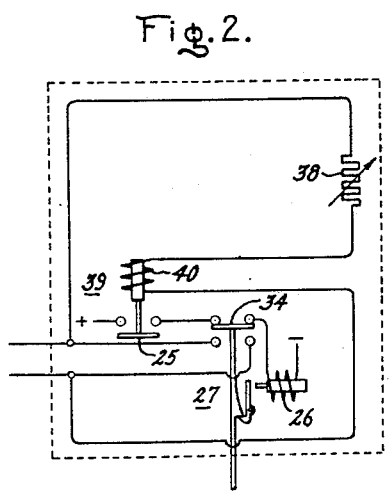
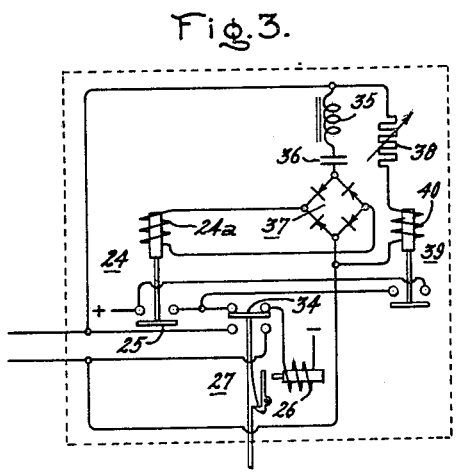
Inventor:
Harold T. Seeley,
by Ernest C. Britton
His Attorney.

Patented Apr. 10, 1951

2,548,625

UNITED STATES PATENT OFFICE 2,548,625

DIFFERENTIAL PROTECTIVE ARRANGEMENT

Harold T. Seeley, Lansdowne, Pa., assignor to General Electric Company, a corporation of New York Application July 30, 1948, Serial No. 41,657

14 Claims. (Cl. 175—294)

My invention relates to electrical protective systems and provides an improved selective internal fault responsive arrangement of the differential type for use in connection with electric bus installations or other sectionalized portions of an electric power system in order more effectively to discriminate between internal and external faults.

Heretofore current differential protective arrangements have been commonly used to protect electric apparatus. For instance, in power bus installations wherein a number of source and feeder lines are connected to the bus through circuit breakers, it has been the practice to connect current transformers in each source and feeder line for differentially energizing a current responsive relay to protect the bus itself and the portions of the source and feeder lines which are disposed between each circuit breaker and the bus by utilizing the difference in current produced by the various current transformers during an internal fault occurring in the protected zone.

Such protective arrangement should not, of course, operate to disconnect those portions of the power circuit which are located within the particular protected zone when faults outside or external to such protected zone occur. Unfortunately, in known differential current protective arrangements the so-called fault current transformer may become saturated during a fault external to the protected zone and as a result, a large unbalance current is produced in the fault responsive current coil of the protective relay which in turn would operate to isolate the bus and associated lines within the particular protected zone. In order to overcome this tendency toward false tripping on external faults, it has been the practice to set the current-responsive relay to trip only on relatively high currents or with time delay. High current settings may prevent desired tripping for internal faults when only low fault currents are involved. Obviously, faults should be cleared promptly and thus time-delay tripping is objectionable. Furthermore, the provision of restraint means to insure against false tripping is very complicated and expensive, especially where many circuits are involved.

By my invention the fault-responsive relay has its operating winding connected in a relatively high impedance circuit in parallel with the secondary of each current transformer whereby the relay need not be set insensitively so as to trip only when relatively high internal fault currents are involved and, furthermore, time delay need not be incorporated as a feature of the protective arrangement since due to the provision of the high impedance relay operating circuit, the voltage produced by the transformer secondaries on internal faults becomes so very much higher than the limited voltage produced on external faults. Ordinary saturable core current transformers may be used and, even if a saturated condition occurs, all chances for improper or false operations are eliminated due to the incorporation of the improved high impedance circuit of the voltage-responsive relay into the protective arrangement instead of the relatively low impedance of a current-responsive relay. However in order to protect the improved high impedance circuit relay itself and circuit elements associated therewith against excessively high voltage occurring during an internal fault condition, a voltage-limiting device is combined therewith.

Thus a principal object of my invention is the provision of a protective arrangement for electric power buses, generators, and the like wherein a high impedance circuit voltage-responsive relay and a voltage-limiting device are used in either parallel or series combination to insure proper tripping for internal faults but never for external faults and to protect against excessive voltages occurring during internal faults.

Another object of my invention is to provide a selective internal fault higher voltage responsive relay energizing arrangement wherein standard bushing-type current transformers are used and wherein complicated control circuits providing restraint are not needed for preventing false operation of the relay on external faults.

A further object of my invention is the provision of a selective internal fault higher voltage producing high impedance relay circuit arrangement whose characteristics are relatively simple to predict in advance and wherein a wide margin of safety is inherently available so that positive operation for internal fault conditions is assured without the likelihood of false tripping for external fault conditions.

A still further object of my invention is to provide a protective arrangement utilizing a high impedance circuit voltage-responsive relay which is not provided with any form of restraint and wherein a tuned circuit is connected in series with the relay operating winding to block the direct current component of error voltage. A tuned circuit for this purpose is superior to a capacitor having the same impedance at fundamental power frequency, because the reactor not only delays the response of the circuit to one-cycle impulse of D.-C. voltage, but also by neutralizing the reactance of the capacitor at this frequency it permits the use of a much smaller capacitor and thus further reduces the relay current resulting from such an impulse.

Still another object of my invention is the provision of a modified protective arrangement wherein a voltage-limiting device having a negative voltage-resistance characteristic and relatively high impedance is connected in series with a differentially-energized low impedance voltage-responsive relay for the purpose of magnifying the normal difference between the force exerted on the relay armature at low and high voltages for the purpose of insuring that the relay will operate in response to high voltage but not in response to low voltage.

A still further object of my invention is to provide a protective arrangement wherein the protective relay coil and circuit elements associated therewith are short-circuited immediately after operation in response to an internal fault so that the time rating of the relay itself and of the circuit elements associated therewith may be held to a minimum.

Further objects and advantages of my invention will become apparent as the following description proceeds and the features of novelty which characterize my invention will be pointed out with particularity in the claims annexed to and forming a part of this specification.

While I have illustrated my invention in connection with an electric power bus, it will be understood that the invention is not limited thereto and that it is equally applicable to other power system component parts such as generators and the like.

Figure 1 of the drawing is a schematic representation of an electric power bus installation together with certain protective apparatus embodying my invention and Figs. 2 and 3 represent alternative arrangements for Fig. 1. It will be understood that Figs. 2 and 3 would be substituted for the portion of Fig. 1 enclosed by dotted lines. In the drawing a single bus conductor only is shown for convenience but it will be obvious to those skilled in the art that the invention is applicable to multiple phase arrangements.

With reference to the drawing the bus is designated by the numeral 1. Source lines 2, 3, and 4 are connected to the bus 1 through circuit breakers 5, 6, and 7 respectively. Feeder lines 8 and 9 are also connected to the bus 1 through circuit breakers 10 and 11. Circuit breakers 5, 6, and 7 are provided with trip coils 12, 13, and 14 respectively while circuit breakers 10 and 11 are provided with trip coils 15 and 16 respectively. Associated with each of the source lines 2, 3, and 4 are the current transformers 17, 18, and 19 respectively. The current transformers 20 and 21 are associated with the feeder lines 8 and 9 respectively. It should be pointed out that the current transformers 17—21 may all be of the standard bushing-type. The secondary leads of all the current transformers 17—21 are connected in parallel at the common connection terminals 22 and 23. If desired, one of these terminals, such as 22, may be grounded. From the description thus far it will be obvious that the zone protected by the relay comprises the bus 1 as well as those portions of the source lines 2, 3, and 4 and of the feeder lines 8 and 9 which are disposed between the bus 1 and the various current transformers, such as 17, 18, 19, 20, and 21. Thus, an internal fault such as might occur at the point X should cause tripping of all the circuit breakers 5, 6, 7, 10, and 11 but an external fault outside of the protected zone such as might occur at the point Y should not cause tripping of any of these circuit breakers.

As will be explained, the maximum voltage which can appear across the connection points 22 and 23 for an external fault is necessarily limited in a particular installation to a relatively small value of the order, say, of 100 volts while the voltage which necessarily must appear across the connection points 22 and 23 for an internal fault will necessarily be very high, so high in fact that suitable means are provided in accordance with my invention to protect the apparatus against these excessive voltages. Thus, by utilizing a voltage-responsive relay, such as 24 the coil 24a of which has a high impedance, it is possible to provide for a pick-up setting of approximately 200 volts, for example, which affords adequate safety margin to provide against false tripping for external faults and which, furthermore, allows for positive and sure operation on internal faults due to the high voltages produced by the secondary windings of the current transformers under internal fault conditions.

For the sake of completeness, a brief explanation of the conditions existing when an external fault occurs is herein included. As is well known, power flowing into the bus 1 through the source lines 2, 3, and 4 and out of the bus through the feeder lines 8 and 9 will cause a circulating current to flow through the parallel circuits which interconnect the secondaries of current transformers 17—21. The voltage induced in the secondary of a particular current transformer, such as 17 for instance, due to normal load current flowing through the conductor 2 will normally be dissipated as a voltage drop through the impedance of the secondary winding of the current transformer 17 and the drop, which is primarily resistive, in the leads which interconnect the secondary of the transformer 17 and the connection points 22 and 23. Thus negligible voltage will appear across connection points 22 and 23. If an external fault occurs, such for example as at the point Y, especially one which is offset so as to include a large D.-C. component, the transformer 20 may become saturated so that the voltage induced in the secondary winding of transformer 20 does not increase in proportion to the increase in current through the feeder line 8. The transformer 20 is commonly referred to under these particular conditions as the fault current transformer while the transformers 17, 18, and 19 are commonly referred to as the source transformers. If a source of generation is connected to the feeder line 9, the transformer 21 will also act as a so-called source transformer. Assuming that generation is connected to conductor 9, the secondaries of transformers 17, 18, 19, and 21 will each carry a portion only of the current supplied to the secondary of the transformer 20. Thus, transformer 20 is likely to saturate. Of course, if the fault current flowing into the point Y is so small as not to cause the transformer 20 to saturate, conditions will be similar to those described above in connection with a normal load condition and substantially no voltage will appear across the connection points 22 and 23. If, however, the transformer 20 is saturated, its induced voltage will be relatively small and the voltage which appears across the connection points 22 and 23 for practical purposes will be the voltage drop caused by the total current flowing through the impedance of the secondary of the current transformer 20 and the impedance, which is largely resistive, of the lines which interconnect the secondary of the transformer 20 and the connecting points 22 and 23 assuming, of course, no appreciable current is taken by the very high impedance relay coil 24a. For practical purposes leakage reactance of the bushing-type fault current transformer 20 on its full winding is very small and may be neglected so that the resistance drop through this secondary winding together with the resistance drop of the leads which interconnect this winding and the points 22 and 23 only need be considered. In a practical installation, this total resistance will amount to some small value, such as 1 ohm for example. If the maximum possible fault current into the point Y is 12,000 amperes, for example, and if the transformer turn ratio is 120 to 1, the maximum current through the secondary of the transformer 20 will be 100 amperes. One hundred amperes flowing through a 1 ohm resistance produces a voltage drop of 100 volts. Thus, under the most extreme external fault conditions, the maximum voltage which can appear across the connection points 22 and 23 is of the order of approximately 100 volts. This voltage will be reduced somewhat by the small current which flows through the relay coil 24a and will also be slightly reduced due to the opposing induced voltage generated in the winding 20. Thus, it will be seen that the 100-volt figure does in fact represent an extreme condition for this typical example.

The pick-up of the voltage-responsive relay 24 can be set at some value well above this 100-volt figure in order to prevent false tripping for an external fault. For practical purposes an adequate margin of safety is provided if the relay 24 is adjusted to close its contact member 25 only when the voltage across the connection points 22 and 23 is 200 volts or greater. I have found that for convenience of design and economy of construction, the circuit of the relay 24 should be provided with an impedance of approximately 3,000 ohms.

For an internal fault, such as might occur at the point X for example, current does not flow out of the bus 1 through the primary of the current transformer 20 on to the feeder line 8 as in the case of an external fault at the point Y, for example. If generation is connected to the feeder line 8, current will flow from such line toward the fault X in the reverse direction from the direction of current flow for the external fault described above at the point Y. Thus for an internal fault at X, all the secondary currents are either zero or are directed similarly between the connection points 22 and 23 so that neither the transformer 20 nor any of the other transformers provides a path for secondary current from the remaining transformers. If no generation is connected to the feeder line 8, no current will flow through the primary of the current transformer 20 when an internal fault occurs at X, and negligible current will flow in its secondary due to applied secondary voltage until saturation of its core occurs. Thus for an internal fault condition, all of the current transformers 17—21 whose primaries are connected to a source of generation will be virtually open circuited since no load except the high impedance of the circuit of coil 24a and the voltage-limiting device and the magnetizing impedance of the remaining current transformers is connected across the secondaries of these source current transformers. Thus, the voltages possible are high, as is well known, so that for an internal fault adequate voltage is sure to be present across the connection points 22 and 23 so that the coil or winding 24a will close its associated contacts 25. From the above analysis it will be observed that, unlike conventional current responsive differential protective arrangements, my invention is characterized by a voltage responsive relay having an operating circuit connected across connection points 22 and 23, the impedance of which is substantially greater than the impedance comprising the leakage reactance and the resistance of the secondary winding of any one of the transformers 17—21 and of the leads which interconnect such secondary with the connection points 22 and 23. When the contacts 25 are closed, the coil 26 of the latched-closed hand-reset relay 27 is energized and causes the relay 27 to lower the operating member 28. As a result, bridging members 29, 30, 31, 32, and 33 complete a control circuit to the circuit breaker trip coils 16, 14, 13, 12, and 15 respectively so that all the circuit breakers 5, 6, 7, 10, and 11 will open their contacts. Operation of the relay 27 also causes the bridging member 34 to complete a short circuit across the connection points 22 and 23 so that the high voltage generated by the various current transformers is not prolonged so that the voltage-limiting device 38 and the coil 24a of the relay need not be designed with a long time rating.

As will be obvious from the drawing, the coil 24a of the relay 24 is energized from the voltage across connection points 22 and 23 through a series reactor 35 and the series capacitor 36 as well as a rectifier 37. The reactor 35 and capacitor 36 are tuned so as to block the D.-C. and harmonic components of error voltage from forcing current through the coil 24a of the relay.

In the case of external faults the D.-C. component appears during the interval between saturation of the core of the current transformer on the faulted feeder and saturation of the cores of the current transformers on the sources, but in case of internal faults the D.-C. component is not reproduced because saturation occurs in the cores of all transformers on each half cycle instead of only those of one polarity. Therefore, the elimination of the D.-C. component from the coil 24a of the relay 24 is of assistance in discriminating between external and internal faults.

The inductance of relay coil 24a varies with changes in plunger position made for adjustment of the pick-up setting, so the rectifier 37 is connected to permit adjustment of the pick-up setting of the relay 24 without changing the tuning of the series circuit comprising the reactor 35 and the capacitor 36.

For the purpose of protecting the coil 24a of the relay 24, the reactor 35, the capacitor 36, and the rectifier 37 against excessively high voltages generated across the connection points 22 and 23 due to an internal fault, a negative voltage-resistance characteristic voltage-limiting device 38 is used. This voltage-limiting device may be constructed of a non-porous, inorganic, ceramic compound or it may be in the form of a glow tube or even a spark gap. In any event, it should be constructed so that its resistance decreases as the voltage impressed across its terminals increases. At relatively low voltages, this voltage-limiting device may have infinite resistance for all practical purposes, while at high voltages, say, of the order of a thousand volts, considerable current would flow due to the substantial reduction in the resistance of the voltage-limiting device 38 as the voltage across its terminals is increased. Thus, when high voltages exist across the connection points 22 and 23 during an internal fault condition, the coil 24a of the relay 24, the reactor 35, the capacitor 36, and the rectifier 37 would be protected against exceptionally high voltage by virtue of the passage of current through the voltage-limiting device 38.

The characteristics of the tuned circuit consisting of reactor 35 and capacitor 36 introduce a small unavoidable delay such as $\%_{60}$ to $\%_{60}$ second in the buildup of current in relay coil 24a. Where the high sensitivity of this arrangement to minimum internal faults is not required, a relay 39 with low-impedance coil 40 connected in series with voltage-limiting device 38 as shown in Fig. 2 can perform the function of relay 24 and circuit elements 35, 36, and 37 associated therewith. In this way high voltages produced during internal fault conditions would not result in unduly stressing the apparatus but would instead result in the passage of a current through such a current-responsive relay which would perform the tripping operation for a greater internal fault promptly, for example in $\frac{1}{60}$ to $\frac{3}{60}$ second. An external fault, however, would not produce a voltage sufficiently high to overcome the high resistance of the voltage-limiting device 38 and only a small current would flow because of the relatively low voltage produced on an internal fault.

Where both sensitivity to minimum interval faults and high speed response to greater interval faults are required, the arrangements of Figs. 1 and 2 can be combined as shown in Fig. 3 so as to provide flexibility of application and adjustment.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. An arrangement for protecting a portion of an electric power system against faults occurring in such portion of the system comprising a plurality of current transformers having their primary windings respectively connected in different conductors of said portion of the system and their secondary windings connected in parallel, and a voltage responsive relay having an operating circuit in parallel with said secondary windings, the impedance of said operating circuit being substantially greater than the impedance comprising the resistance and leakage reactance of any one of said secondary windings and its leads.

2. A selective internal fault responsive arrangement for a portion of an electric power system, comprising a plurality of saturable-core current transformers respectively energizable by fault currents into and out of such portion, a relay provided with an operating winding connected with the secondary of each transformer in a parallel circuit having sufficient impedance therein to prevent operation of the relay in response to energization of the circuit by the limited voltage produced by the secondaries upon saturation of any transformer during any external fault, and a voltage limiting device connected to limit the higher voltages produced by the secondaries for energizing the circuit to operate the relay upon an internal fault.

3. A selective internal fault responsive arrangement for a portion of an electric power system comprising a plurality of saturable-core current transformers having their primary windings respectively connected in the external conductors from said portion of the system and their secondary windings connected in parallel across two connection points to produce a voltage thereacross limited by the saturation of a transformer upon external faults and higher voltages thereacross upon internal faults and a relay having an operating winding connected across said connection points in a circuit having sufficient impedance to effect operation of the relay only in response to the higher voltages produced thereacross upon internal faults.

4. In combination, a plurality of circuit breakers for protecting a portion of an electric power system against faults, each breaker having a saturable-core current transformer in series therewith in a corresponding external conductor of said portion, means for tripping said circuit breakers including a relay having an operating winding connected in parallel with the secondary of each transformer and having a relatively higher impedance circuit and voltage response setting for preventing operation of the relay by the limited voltage produced upon saturation of any transformer during an external fault in the system and a voltage limiting device connected to limit the higher voltages produced by said secondary windings for operating said relay upon an internal fault in said portion of the system.

5. A selective internal fault responsive arangement for protecting a portion of an alternating current electric power system comprising a separate interrupter for each circuit into and out of such portion of the system, a separate saturable-core current transformer in series with each circuit interrupter, and means for tripping the circuit interrupters including a relay having an operating winding connected in a sufficiently high impedance circuit in parallel with the secondary winding of each transformer to prevent response of the relay upon saturation of any transformer by an external fault whereby said windings produce sufficient voltage for operating the relay to trip said interrupters only upon an internal fault in said portion of the system.

6. An internal fault selective arrangement for protecting a portion of an alternating current electric power system comprising a separate circuit interrupter for each circuit leading into and out of such portion of the system, a separate saturable-core current transformer in series with each circuit interrupter, a relay having an operating winding connected in a sufficiently high impedance circuit in parallel with the secondary winding of each transformer to prevent operation of the relay by the limited voltage across any transformer secondary upon saturation of the transformer during an external fault, means controlled by the relay for tripping said interrupters upon operation of the relay in response to the increased voltage produced by said secondary windings during an internal fault in said portion of the system and a voltage limiting device connected with the secondary winding of each transformer for limiting the increase in voltage produced for operating the relay under internal fault conditions.

7. A selective internal fault protective arrangement for a portion of an alternating current electric power system comprising a circuit interrupter and a saturable-core current transformer for each external circuit of such portion, and means including a voltage responsive relay for tripping said interrupters, said relay having an operating circuit in parallel with and of substantially higher impedance than the secondary winding of each transformer upon saturation thereof to render the relay unresponsive to the limited voltage produced across such winding under any external fault conditions and a variable resistance device connected in parallel with said operating circuit for limiting the increased voltage produced by the secondary winding for operating the relay under internal fault conditions, said device having a resistance which automatically decreases when the voltage applied thereto increases.

8. A selective internal fault responsive arrangement for a portion of an alternating current power system comprising a plurality of saturable-core current transformers having their primary windings respectively connected in the external conductors of such portion of the system, a relay operating circuit connected in parallel with the secondary winding of each transformer and including a reactance and a capacitor tuned for blocking the direct component of error voltage and for substantially eliminating harmonics produced in the secondaries of the transformers, a two-way rectifier connected in series in the operating circuit with the reactor and capacitor, a relay having an operating winding connected to be energized with direct current from the rectifier, said winding having a sufficiently high impedance and operating voltage setting to prevent operation of the relay by the limited voltage produced upon saturation of any transformer during an external fault in the system, and a voltage limiting device connected in parallel with the operating circuit for limiting the higher voltage produced by the secondary windings for energizing the winding to operate the relay during an internal fault in said portion of the system.

9. A selective internal fault responsive arrangement for a portion of an electric power system having in combination a plurality of saturable-core transformers having their primary windings separately energized by fault current into and out of such portion, a relay having an operating winding and a response limiting resistance device connected in series therewith, means for connecting said winding and said device in parallel with the secondary winding of each transformer, and said device having a sufficiently high resistance to prevent response of the relay to the limited voltage produced by the secondaries upon saturation of any transformer during an external fault whereby the winding operates the relay only in response to the relatively higher voltages produced by the secondaries upon an internal fault.

10. A selective internal fault responsive arrangement for a portion of an electric power system having in combination a plurality of saturable-core transformers having their primary windings respectively connected in the external conductors of said portion of the system, a relay having a sufficiently high impedance operating circuit connected in parallel with the secondary of each transformer to prevent response of the relay to the limited voltage produced by the secondaries upon saturation of any transformer during an external fault, a voltage limiting device connected with the secondary of each transformer for limiting the higher voltages produced thereby upon internal faults and means controlled by the relay for short-circuiting the secondary winding of each transformer upon operation of the relay in response to the relatively higher voltage produced by the secondaries upon internal faults.

11. A differential protective arrangement for use in connection with electric power apparatus having incoming and outgoing power conductors, comprising a circuit interrupter and a saturable current transformer for each of said conductors, said transformers having primary windings respectively connected in series with the corresponding conductor and interrupter, means for connecting the secondaries of said transformers in parallel circuit relationship, means including a relay having an operating winding and a voltage limiting device therefor connected with the secondary of each transformer in a circuit of sufficient impedance for causing operation of the relay to trip said interrupters only upon response of the relay to the limited higher voltages produced by the parallel connected secondary windings of said transformers during any internal fault than during a maximum external fault, and means controlled by the said relay for short-circuiting the secondary windings of said transformers upon response of the relay.

12. A selective internal fault responsive arrangement for a portion of an alternating current power system comprising a plurality of saturable-core current transformers respectively energizable by fault currents into and out of said portion, a sensitive relay having relatively high impedance operating winding connected in a circuit in parallel with and of sufficiently greater impedance than the secondary of each transformer upon saturation thereof by a maximum external fault to operate the sensitive relay only in response to a higher voltage produced by the parallel connected secondaries upon a minimum internal fault, a voltage limiting self-variable resistance device connected in a separate circuit in parallel with the secondaries for limiting said higher voltage and a relay having a relatively low impedance operating winding connected in series with said variable resistance device to be unresponsive to external faults and for quickly responding only to the higher voltages produced upon internal faults.

13. A selective internal fault responsive arrangement for a portion of an alternating power system comprising a plurality of saturable-core current transformers respectively energized by fault currents into and out of said portion, a relay operating circuit connected in parallel with the secondary winding of each transformer and including a reactance and a capacitor tuned for blocking the direct component of error voltage and for substantially eliminating harmonics produced in the secondaries of the transformers, a two-way rectifier connected in series in the relay operating circuit with the reactor and the capacitor, a sensitive relay having a relatively high impedance operating winding connected to be energized with direct current from the rectifier, said winding having a sufficiently high impedance and operating voltage setting to prevent operation of the relay by the limited voltage produced upon saturation of any transformer during an external fault in the system, a voltage limiting variable resistance device connected in a separate circuit in parallel with the operating circuit for limiting the higher voltages produced by the secondary windings for energizing the operating winding to operate the sensitive winding during a minimum internal fault, and a relay having a relatively low impedance operating winding connected in series with said variable resistance device to be unresponsive to external faults and for quickly responding to the higher voltages produced upon internal faults.

14. A selective internal fault arrangement for a portion of an alternating current power system comprising a plurality of saturable-core current transformers having their primary windings respectively energized by fault currents into and out of said portion, a relay operating circuit connected in parallel with the secondary winding of each transformer and including a reactance and capacitor tuned for blocking the direct component of error voltage and for substantially eliminating harmonics produced in the secondaries of the transformers, a two-way rectifier connected in series in the operating circuit with the reactor and capacitor, and a relay having a relatively high impedance operating winding connected to be energized with direct current from the rectifier, said operating circuit and said winding providing a sufficiently high impedance to prevent operation of the relay by the limited voltage produced upon saturation of any transformer during an external fault in the system whereby the relay is responsive only to the higher voltages produced by the transformer secondaries upon an internal fault.

HAROLD T. SEELEY.

REFERENCES CITED

The following references are of record in the file of this patent:

UNITED STATES PATENTS

| Number | Name | Date |
| --- | --- | --- |
| 618,812 | Cartwright | Jan. 31, 1899 |
| 656,680 | Thompson | Aug. 28, 1900 |
| 1,890,775 | Fournier | Dec. 13, 1932 |
| 2,157,886 | Cuttino | May 9, 1939 |
| 2,384,375 | Hayward | Sept. 4, 1945 |

FOREIGN PATENTS

| Number | Country | Date |
| --- | --- | --- |
| 442,763 | Germany | Mar. 14, 1929 |